W. E. McCORKLE.
NUT DEPOSITOR FOR CONFECTIONERY MACHINES.
APPLICATION FILED AUG. 8, 1917.

1,343,924.

Patented June 22, 1920.
2 SHEETS—SHEET 1.

WITNESSES

INVENTOR
William E. McCorkle.
BY
ATTORNEY

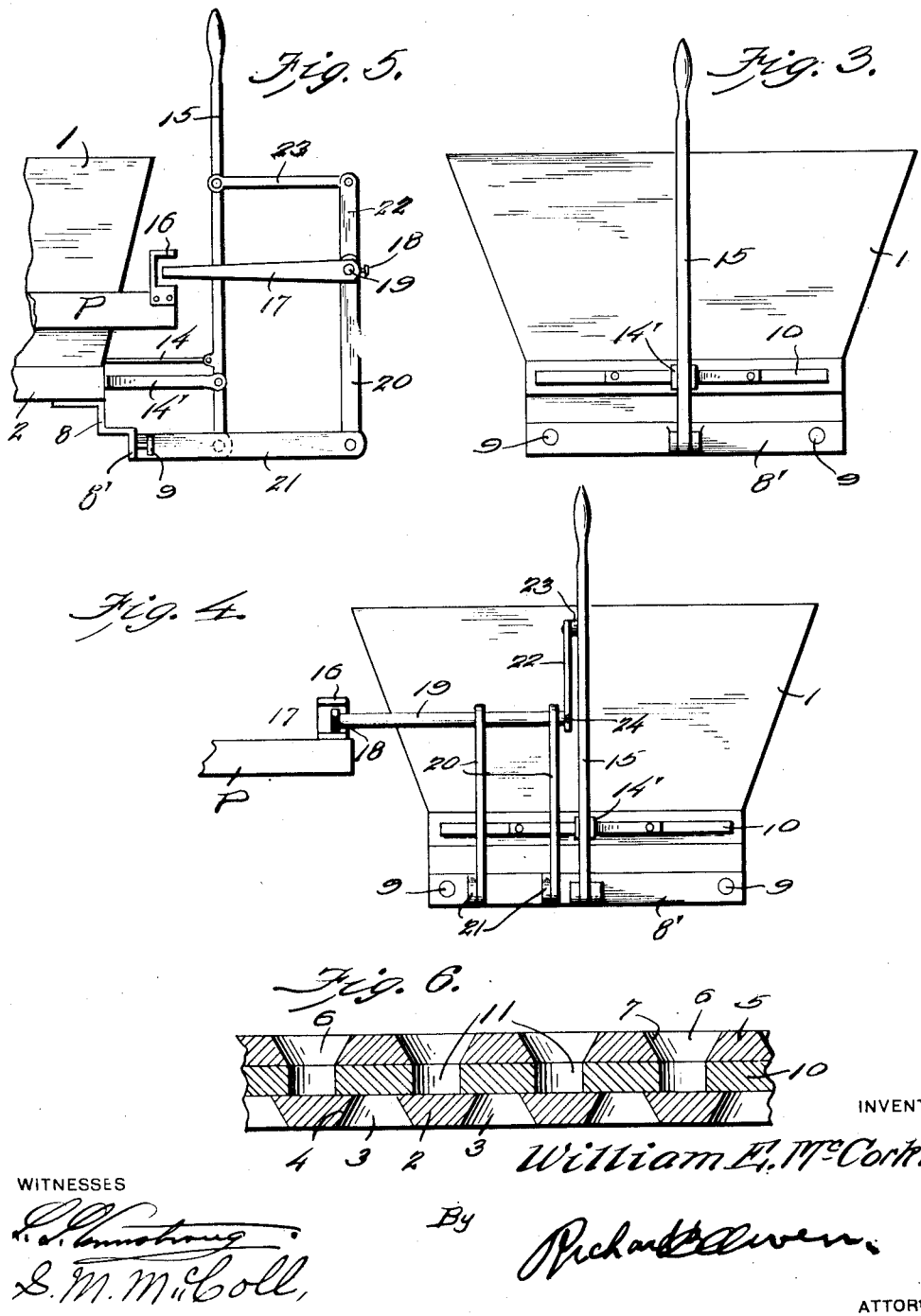

UNITED STATES PATENT OFFICE.

WILLIAM ELLWOOD McCORKLE, OF OAK STATION, PENNSYLVANIA.

NUT-DEPOSITOR FOR CONFECTIONERY-MACHINES.

1,343,924.

Specification of Letters Patent. Patented June 22, 1920.

Application filed August 8, 1917. Serial No. 185,164.

*To all whom it may concern:*

Be it known that I, WILLIAM E. Mc-CORKLE, a citizen of the United States, residing at Oak Station, in the county of Allegheny and State of Pennsylvania, have invented certain new and useful Improvements in Nut-Depositors for Confectionery-Machines, of which the following is a specification.

This invention relates to confectionery apparatus, and more particularly to what are known in the art as "nut depositors."

The primary object of the invention is to so construct a device of this character that an entire tray or set of molds consisting of several rows having several molds in each row will be supplied with nut meats by a single discharge or one actuation of the mechanism.

Another object is to so construct a device of this character that it may be either manually or automatically operated as desired.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Fig. 3 is an end elevation,

Fig. 4 is a similar view showing the actuating lever connected up for automatic operation of the depositor, Fig. 5 is a detail transverse section taken on the line 5—5 of Fig. 4, and Fig. 6 is an enlarged detail longitudinal sectional view through the bottom of the depositor.

Figure 1:
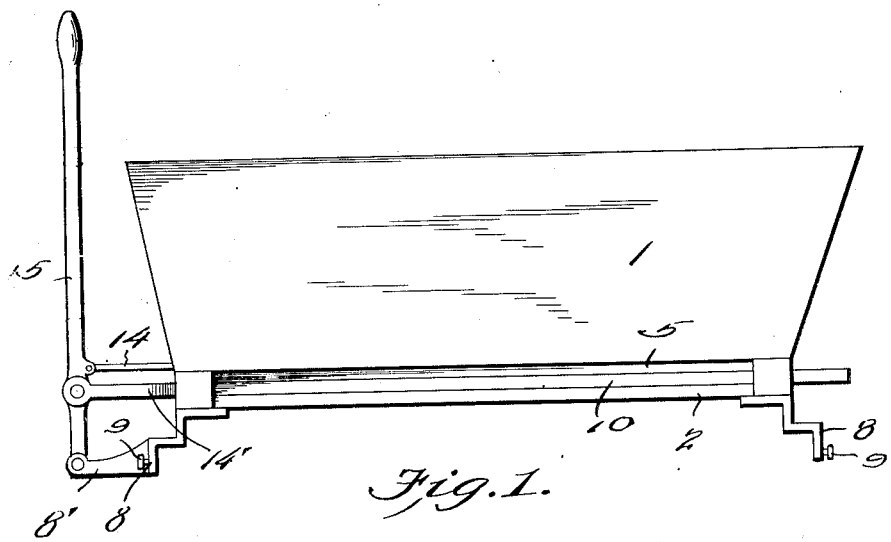
Figure 1 represents a side elevation of a nut depositor constructed in accordance with this invention and adapted to be manually operated.

In the embodiment illustrated, the depositor constituting this invention is designed to be mounted on an apparatus for making confectionery in which nut meats are molded or incased in candy, and it is adapted to be mounted on such an apparatus adjacent the "printer" of the apparatus, which latter is designed for forming an impression in the starch mold which receives the liquid confection.

As the apparatus in connection with which this depositor is used constitutes no part of the invention, it is not deemed necessary or advisable to show any part thereof except the portion of the printer to which the actuating lever of this invention is connected for automatic actuation.

This improved depositor comprises a hopper 1, which is designed to be filled with nut meats to be distributed and may have a top if desirable, but none is here shown. This hopper is provided with a bottom 2 having a plurality of longitudinally alined spaced openings 3, the walls of which flare downwardly as shown at 4 in Fig. 6 to prevent the nuts which are deposited from being cut or mutilated. A false bottom 5 is supported in said hopper in a plane above the permanent bottom 2 and is spaced therefrom a sufficient distance to receive between said bottoms an intermediate slide 10. The false bottom 5 is also provided with series of longitudinally alined apertures 6, the walls of which flare outwardly as shown at 7. The apertures 6 in the bottom 5 are arranged in staggered relation to the apertures 3 of bottom 2 as is shown clearly in Fig. 6 for a purpose presently to be described.

The slide 10 which is designed to reciprocate between the bottoms 2 and 5, is of a length greater than that of the hopper and extends through the opposite ends thereof as is shown clearly in Fig. 1, said slide being made sufficiently long to provide for its reciprocation back and forth to bring into and out of register apertures 11 formed therein, which, when the slide is in one position register with apertures 6 as shown in Fig. 6, and when in this position, these apertures are closed at their lower ends by the bottom 2 and are designed to receive the nut meats contained in the hopper so that when the slide is moved in the opposite direction, these apertures 11 will be brought into register with the apertures 3 in bottom 2 and thus discharge the meats contained in said apertures 3 into a tray, not shown, which is designed to pass beneath the depositor and be held in position below it a sufficient time to permit the nut meats to be discharged thereinto.

The hopper 1 is provided at its opposite ends with depending brackets 8 having clamping screws 9 which are designed to reliably connect the hopper to its support which is usually the rail of the printing apparatus of a confectionery machine, but obviously it may be mounted on any other support such as when the device is to be used for depositing nuts in trays fed by hand thereunder.

Figure 2:
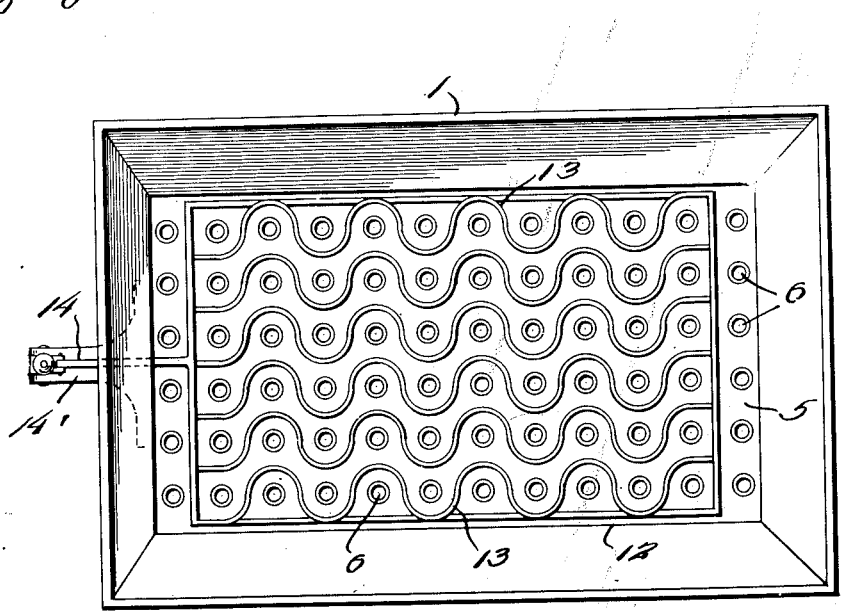
Fig. 2 is a plan view thereof.

Mounted in the hopper 1 and resting on the false bottom 5 is a wire frame 12 here shown rectangular in form to conform to the configuration of the hopper and which is of a length less than said bottom to provide for its reciprocation thereover. This frame 12 is provided with a plurality of longitudinally extending serpentine upstanding partitions or strips 13 which are so arranged as to separate the apertures of each row of bottom 5 as is shown clearly in Fig. 2, one aperture being arranged in one bend of said strip and the next in the adjacent bend.

A bar or rod 14 extends laterally from the front end of the frame 12 and is designed to be connected with an operating lever 15 which is fulcrumed at one end to a cross bar 8' which connects brackets 8.

The front end of the slide 10 is also pivotally connected with the lever 15 by an arm 14' so that when said lever is moved toward and away from the hopper said slide will be reciprocated between the bottoms 2 and 5 for the purpose above described. The reciprocatory movement of this slide 10 is controlled by the engagement of the ends of frame 12 with the ends of the hopper 1 in its reciprocatory movement and the parts are so proportioned and positioned that when said frame is at its extreme forward movement, the apertures 11 in slide 10 will register with the apertures 3 in bottom 2 and when it is at the limit of its rear movement, said apertures 11 will register with the apertures 6 in the false bottom 5.

It will thus be seen that one movement of this lever 15 will operate to deposit the nut meats contained in all of the apertures 11 of the slide 10 into the trap or other receptacle disposed below the hopper ready to receive them.

In Figs. 4 and 5 the lever 15 is connected with a movable part of the confectionery apparatus for automatically actuating it and it is here shown connected with a member of the printer, indicated at P, so that when said printer moves to form the impressions in the starch disposed below it, it will simultaneously operate the lever 15 to cause the depositor to deposit nut meats in the trap arranged in advance of the printer and which has already received an impression therefrom.

The means for connecting this lever 15 with the printer member P are here shown in the form of a bracket 16 secured to the printer and which is here shown U-shaped with one leg secured to the movable printer member P and opening outwardly and into which extends one end of an arm 17, the other end of which is secured by a set screw 18 to a rock shaft 19 mounted in suitable bearings carried by the upper ends of two standards 20. These standards 20 are carried by arms 21 which project from cross bars 8'. A link 22 connects shaft 19 with a pitman 23 which is pivotally connected with the lever 15 as is shown clearly in Figs. 4 and 5 so that the operation of the printer will actuate said lever in the manner above described to reciprocate the slide 10 automatically. The link 22 is adjustably engaged with shaft 19 by a set screw 24.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A device of the class described comprising a container having superposed spaced apertured bottoms, the apertures in said bottoms being disposed out of register with each other, a slide mounted to reciprocate between said bottoms and having apertures positioned to register with the apertures in one bottom of the container when at the limit of its extreme movement in one direction and with those of the other bottom when at the limit of its movement in the other direction, and a skeleton frame mounted to slide over the inner bottom of said container and having serpentine strips arranged longitudinally of said frame.

2. A device of the class described, comprising a container having superposed spaced apertured bottoms, the apertures in said bottoms being disposed out of register with each other, a slide mounted to reciprocate between said bottoms and having apertures positioned to register with the apertures in one bottom of the container when at the limit of its extreme movement in one direction and with those of the other bottom when at the limit of its movement in the other direction, and a skeleton frame mounted to slide over the inner bottom of said container and having serpentine strips arranged longitudinally of said frame, said frame being shorter than the container bottom with the strips positioned so that the bends therein will extend alternately around the apertures in said bottom.

3. A device of the class described comprising a container having superposed spaced apertured bottoms, the apertures in said bottoms being disposed out of register with each other, a slide mounted to reciprocate between said bottoms and having apertures positioned to register with the apertures in one bottom of the container when at the limit of its extreme movement in one direction and with those of the other bottom when at the limit of its movement in the other direction, a skeleton frame mounted to slide over the inner bottom of said container and having serpentine strips arranged longitudinally of said frame, an arm extending longitudinally from one end of said frame through said container end, a lever fulcrumed at one end on said container end, said slide extending through said container end and connected with said lever above its fulcrum, said frame arm being also connected with said lever whereby the frame and slide are reciprocated simultaneously on the rocking of said lever.

4. A device of the class described comprising a container having superposed plates with rows of apertures therein, the apertures in one plate being normally out of register with those in the other and one plate slidable relatively to the other, and a skeleton frame mounted to slide over the upper plate and having separating means arranged between the apertures of each row.

5. A device of the class described comprising a container having superposed plates with rows of apertures therein, the apertures in one plate being normally out of register with those of the other, one plate being slidable relatively to the other, and a skeleton frame mounted to slide over the upper plate and having serpentine strips with the bends thereof positioned to extend alternately over the apertures in said plate on which it rests.

In testimony whereof I affix my signature in presence of two witnesses.

WILLIAM ELLWOOD McCORKLE.

Witnesses:
 HENRY A. KUNKLE,
 WM. WATERMAN.